US012802110B2

(12) United States Patent
Aher et al.

(10) Patent No.: US 12,802,110 B2
(45) **Date of Patent: *Nov. 17, 2026**

(54) SYSTEMS AND METHODS FOR GENERATING PERSONALIZED ITEM DESCRIPTIONS

(71) Applicant: Adeia Guides Inc., San Jose, CA (US)

(72) Inventors: Ankur Anil Aher, Kalyan (IN); Susanto Sen, Bangalore (IN)

(73) Assignee: Adeia Guides Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/947,934

(22) Filed: Nov. 14, 2024

(65) Prior Publication Data

US 2025/0069127 A1 Feb. 27, 2025

Related U.S. Application Data

(63) Continuation of application No. 18/227,596, filed on Jul. 28, 2023, now Pat. No. 12,175,514, which is a (Continued)

(51) Int. Cl.
*G06Q 30/0601* (2023.01)
*G06F 16/28* (2019.01)
(Continued)

(52) U.S. Cl.
CPC ....... *G06Q 30/0623* (2013.01); *G06F 16/285* (2019.01); *G06Q 10/10* (2013.01); (Continued)

(58) Field of Classification Search
CPC ............... G06Q 30/0623; G06Q 10/10; G06Q 30/0201; G06Q 30/0282; G06Q 30/0631; (Continued)

(56) References Cited

U.S. PATENT DOCUMENTS 10,740,064 B1 * 8/2020 Reddy .................. G11B 27/031
2007/0101271 A1 * 5/2007 Hua ..................... G11B 27/034 715/202

(Continued)

OTHER PUBLICATIONS

A. M. Ferman, P. van Beek, J. H. Errico and Sezan MI, "Multimedia content recommendation engine with automatic inference of user preferences," Proceedings 2003 International Conference on Image Processing (Cat. No.03CH37429), Barcelona, Spain, 2003, pp. III-49, doi: 10.1109/ICIP.2003.1247178. (Year: 2003).*

(Continued)

*Primary Examiner* — Sun M Li
(74) *Attorney, Agent, or Firm* — HG Law LLP

(57) ABSTRACT

Systems and methods are provided for dynamically generating a product description personalized for a target user account. Product description data and/or product comment data associated with the product are obtained from a server via a communication network. Based on the product description data and/or product comment data, a product description template, comprising fields to be populated, is generated and stored in memory. Comment data associated with a product of interest is obtained from a server via the network. The comment data originates from a set of user accounts each having a similarity score with a target user account that is above a similarity threshold. Based on the set of comment data, comment-based description data are generated and stored in memory. Based on the product description template and the comment-based description data, a product description is generated for presentation for the target user account.

20 Claims, 17 Drawing Sheets

600

| 606 Origin | 604 Input ID | 602 Input | 608 Tagged sentence |
|---|---|---|---|
| Provider 1 | Inp1 | Dell Inspiron has great battery life | <Dell Inspiron>(PRODUCT_NAME) has <great>(ADJECTIVE) <battery life>(FEATURE) |
| Cert User 1 | Inp2 | Lag-free, smooth display is worth every penny | <Lag free, smooth>(ADJECTIVE_LIST) <display>(FEATURE) is worth every penny |
| Cert User 2 | Inp3 | MacBook is a good laptop | <MacBook>(PRODUCT_NAME) is a <good>(ADJECTIVE) <laptop>(NATURE) |
| Provider 2 | Inp4 | The laptop justifies the cost Price | The <laptop>(NATURE) justifies the cost price |

Related U.S. Application Data continuation of application No. 17/001,099, filed on Aug. 24, 2020, now Pat. No. 11,756,093.

(51) Int. Cl.

| | |
|---|---|
| ***G06Q 10/10*** | (2023.01) |
| ***G06Q 30/0201*** | (2023.01) |
| ***G06Q 30/0282*** | (2023.01) |
| *G06F 40/186* | (2020.01) |

(52) U.S. Cl.
CPC ..... *G06Q 30/0201* (2013.01); *G06Q 30/0282* (2013.01); *G06Q 30/0631* (2013.01); *G06Q 30/0641* (2013.01); *G06F 40/186* (2020.01)

(58) Field of Classification Search
CPC ............ G06Q 30/0641; G06Q 30/0269; G06F 16/285; G06F 40/186; G06F 40/174
See application file for complete search history.

(56) References Cited

U.S. PATENT DOCUMENTS

| | | | | |
|---|---|---|---|---|
| 2007/0118441 | A1* | 5/2007 | Chatwani | G06Q 30/0603 705/26.8 |
| 2008/0147659 | A1* | 6/2008 | Chen | G06F 16/9535 707/999.005 |
| 2014/0089134 | A1* | 3/2014 | Linh | G06Q 20/384 705/26.7 |
| 2015/0149473 | A1* | 5/2015 | Wheatley | G06F 16/41 707/741 |
| 2015/0348061 | A1* | 12/2015 | Yan | G06F 16/24558 705/7.29 |
| 2016/0063595 | A1* | 3/2016 | Oral | G06Q 30/0621 705/26.7 |
| 2017/0116658 | A1* | 4/2017 | Baid | G06Q 30/0625 |
| 2022/0245676 | A1* | 8/2022 | Guo | G06Q 30/0631 |
| 2023/0027530 | A1* | 1/2023 | Jeganathan | G06F 16/951 |

OTHER PUBLICATIONS

Ching-Cheng Lee and Wei Xu, "Category-based Web personalization system," 25th Annual International Computer Software and Applications Conference. COMPSAC 2001, Chicago, IL, USA, 2001, pp. 621-625, doi: 10.1109/CMPSAC.2001.960677. (Year: 2001).*

Y. Xu, W. Wang, J. Yang and J. Li, "Research on online user comments in artificial intelligence times," 2019 IEEE 8th Joint International Information Technology and Artificial Intelligence Conference (ITAIC), Chongqing, China, 2019, pp. 507-511, doi: 10.1109/ITAIC.2019.8785739. (Year: 2019).*

F. Ben Kharrat, A. Elkhleifi and R. Faiz, "Recommendation system based contextual analysis of Facebook comment, " 2016 IEEE/ACS 13th International Conference of Computer Systems and Applications (AICCSA), Agadir, Morocco, 2016, pp. 1-6, doi: 10.1109/AICCSA.2016.7945792. (Year: 2016).*

A. Messenger and J. Whittle, "Recommendations Based on User-Generated Comments in Social Media," 2011 IEEE Third International Conference on Privacy, Security, Risk and Trust and 2011 IEEE Third Intl Conference on Social Computing, Boston, MA, USA, 2011, pp. 505-508, doi: 10.1109/PASSAT/Social (Year: 2011).*

* cited by examiner

600

| Origin (606) | Input ID (604) | Input (602) | Tagged sentence (608) |
|---|---|---|---|
| Provider 1 | Inp1 | Dell Inspiron has great battery life | <Dell Inspiron>(PRODUCT_NAME) has <great>(ADJECTIVE) <battery life>(FEATURE) |
| Cert User 1 | Inp2 | Lag-free, smooth display is worth every penny | <Lag free, smooth> (ADJECTIVE_LIST) <display> (FEATURE) is worth every penny |
| Cert User 2 | Inp3 | MacBook is a good laptop | <MacBook>(PRODUCT_NAME) is a <good>(ADJECTIVE) <laptop>(NATURE) |
| Provider 2 | Inp4 | The laptop justifies the cost Price | The <laptop>(NATURE) justifies the cost price |

FIG. 6

700

704 702 706

| Template ID | Description template | Importance score |
|---|---|---|
| Temp1 | <PRODUCT_NAME> has <ADJECTIVE_LIST> <FEATURE> | 2 |
| Temp2 | <ADJECTIVE_LIST> <FEATURE> is worth every penny | 3 |
| Temp3 | <ADJECTIVE_LIST> <FEATURE> justifies the cost | 3 |
| Temp4 | <PRODUCT_NAME> is a <ADJECTIVE> <NATURE> | 1 |

FIG. 7

1100

| Origin (1106) | Input ID (1104) | Input (1102) | Tagged sentence (1108) | Date (1110) |
|---|---|---|---|---|
| Similar User1 | Com1 | I like the beautiful keyboard | I like the <beautiful>(ADJECTIVE) <keyboard>(FEATURE) | 2020/01/30 |
| Similar User2 | Com2 | A whole day without charging the battery: exceptional! | A whole day without charging the <battery>(FEATURE): <exceptional>(ADJECTIVE)! | 2019/09/23 |
| Similar User3 | Com3 | The case gets hot very quickly | The <case>(FEATURE) gets <hot>(ADJECTIVE) very quickly | 2020/07/10 |

FIG. 11

SYSTEMS AND METHODS FOR GENERATING PERSONALIZED ITEM DESCRIPTIONS

CROSS-REFERENCE TO RELATED APPLICATIONS

This application is a continuation of U.S. patent application Ser. No. 18/227,596, filed Jul. 28, 2023, which is a continuation of U.S. patent application Ser. No. 17/001,099, filed Aug. 24, 2020, now U.S. Pat. No. 11,756,093, which is hereby incorporated by reference herein in its entirety.

BACKGROUND

The present disclosure generally relates to generating and providing tailored descriptions of products, content items, and/or other types of items. In one example, the present disclosure specifically relates to systems and methods for dynamically generating a product description personalized for a target user account.

SUMMARY

Content provider systems, such as Netflix, Hulu, Amazon Prime, and the like, provide for display content item descriptions that consist of a few paragraphs or bullets points about the movie or other type of content item. Such content item descriptions are aimed at helping the user understand more about the program and make an informed decision as to which content item to select for consumption. In this respect, some content providers have developed algorithms that propose personalized content item suggestions to a user. The quality of such suggestions, judged a posteriori (i.e., after the user has watched the suggested content item), has become a criterion to keep existing users and to acquire new customers. It would be beneficial, therefore, to have improved content item suggestions. Similar considerations apply with e-commerce websites, such as Amazon or eBay, where a user is browsing for items to purchase and may be presented with descriptions of such items.

In view of the foregoing, the present disclosure provides systems and related methods for generating and providing a dynamic content description, personalized to a user (or to a user account), instead of a static content description which is the same for all users. The dynamic and personalized content description, in one example, is based on a user's interest and uses to a collaborative filtering that processes inputs from other users to determine an appropriate content description.

One system for dynamically generating a product description personalized for a target user account includes a memory storing instructions and control circuitry communicably coupled to the memory and configured to access the memory and execute the instructions. The control circuitry obtains, from one or more servers via a communication network, at least one of product description data associated with a product or product comment data associated with the product. Based on at least one of the product description data or the product comment data, the control circuitry generates a product description template, comprising fields to be populated, and stores the product description template in the memory. The control circuitry obtains, from one or more servers via the communication network, a first set of comment data associated with a product of interest. The first set of comment data, in one example, originates from a first set of user accounts, each having a similarity score with a target user account that is above a similarity threshold. Based on comment data from the first set of comment data, the control circuitry generates comment-based description data, and stores the comment-based description data in the memory. A product description is generated for aural or visual presentation for the target user account. Generating the product description, in one example, includes retrieving the product description template from the memory, retrieving the comment-based description data from the memory, and populating the fields of the retrieved product description template based on the retrieved comment-based description data.

The control circuitry, in some aspects, is further configured to detect, from the target user account, an access request to the product of interest. The product description may then be generated in response to the detecting, from the target user account, the access request to the product of interest.

In a further example, the control circuitry is configured to generate the product description template by analyzing the product description data and the product comment data. The product description data and product comment data are analyzed, for instance, by: identifying an information item in the product data (production description data or product comment data), associating a tag to the information item, identifying a structure of the product data, and creating a product description template comprising the structure and at least one field, each field being linked to a tag.

The control circuitry, in some examples, is further configured to generate and store in the memory a plurality of product description templates.

The product description data, for instance, may relate to the product of interest or to similar products, and the product comment data may relate to the product of interest or to similar products. The product description data may originate from a product provider or the like, and the product comment data may originate from a set of certified user accounts or the like.

In one aspect, the control circuitry is configured to populate the fields of the retrieved product description template by selecting comment-based description data based on an input date of comment data or with an engagement value of the user account with respect to the product of interest. In another aspect, the control circuitry is configured to populate the fields of the retrieved product description template by selecting a field in the product description template, the field being linked to a tag, and selecting an information item of the comment-based description data that is associated with the tag.

In another aspect, the control circuitry is configured to generate the comment-based description data by analyzing comment data of the first set of comment data, the comment data of the first set of comment data being associated with the product of interest and including information items. The analyzing the comment data of the first set of comment data may include identifying an information item in the comment data and associating a tag to the information item. The control circuitry may be further configured to analyze the comment data of the first set of comment data by creating a list including a plurality of information associated with a same tag, and populate the fields of the retrieved product description template by selecting, for a field in the production description template linked to the tag, an information item from the list.

In some examples, the control circuitry is configured to analyze the comment data of the first set of comment data by: selecting a second set of comment data amongst the first set of comment data, the selection being based on a priority score wherein the priority score includes at least one of a number of likes of the comment data, a number of dislikes of the comment data, a number of shares of the comment data, and/or a number of replies to the comment data. In another example, the control circuitry is configured to analyze the product data or comment data by using at least one of part-of-speech tagging, dependency parsing, or domain knowledge.

The control circuitry, in another aspect, is further configured to generate the product description template by attributing an importance score to the product description template. The importance score is stored in the memory, and the product description is generated by retrieving from the memory a plurality of product description templates and their respective importance scores, the importance scores being different, and concatenating the plurality of product description templates based on their importance scores. The product description templates may be concatenated according to a decreasing importance score. At least two product description templates may, in some examples, have the same importance, and the control circuitry may be configured to generate the product description by retrieving from the memory the two product description templates, receiving a target-user input, and selecting one of them based on the target-user input. The target-user input, for instance, may include an input made by the target user account for a product different from the product of interest.

The first set of user accounts may be identified by a recommender system using at least one of collaborative filtering, content-based filtering, and/or a knowledge-based system, in some aspects.

In a further aspect, the control circuitry is further configured to receive an identifier of a product of interest via a recommender system that uses a second set of user accounts, obtain the second set of user accounts, and select the first set of user accounts amongst the second set of user accounts. The first set of user accounts is selected amongst the second set of user accounts, based on at least one of: a similarity score between the target user account and a similar user account, the number of inputs made by a similar user account, or an engagement value of the target user account with respect to the product of interest. The product of interest may include, for example, a media asset and/or an item to acquire. The engagement value of the target user account may include, for a product being a media asset, a percentage of the media asset viewed via the target user account.

In yet another aspect, the control circuitry is further configured to, after a first product description has been generated at a given time, obtain new comment data from the first set of user accounts, the new comment data being generated after the given time or originating from user accounts newly introduced in the first set of user accounts. The control circuitry generates and stores in memory new comment-based description data and generates a new product description based on the new comment-based description data.

The control circuitry may, for example, be further configured to update the first set of user accounts. The first set of user accounts may be updated, for instance, based on a modification in a similarity score of a user account with respect to the target user account.

BRIEF DESCRIPTION OF THE DRAWINGS

The above and other objects and advantages of the disclosure will be apparent upon consideration of the following detailed description, taken in conjunction with the accompanying drawings, in which:

FIG. 5 depicts an illustrative flowchart representing in more detail the generation of the description template, in accordance with some embodiments of the disclosure;

FIG. 6 depicts an illustrative representation of product data and the process thereof, in accordance with some embodiments of the disclosure;

FIG. 7 depicts an illustrative representation of a database of description templates stored in the memory, in accordance with some embodiments of the disclosure;

FIG. 11 depicts an illustrative representation of comment-based description data and the process thereof, in accordance with some embodiments of the disclosure;

DETAILED DESCRIPTION

Figure 1:
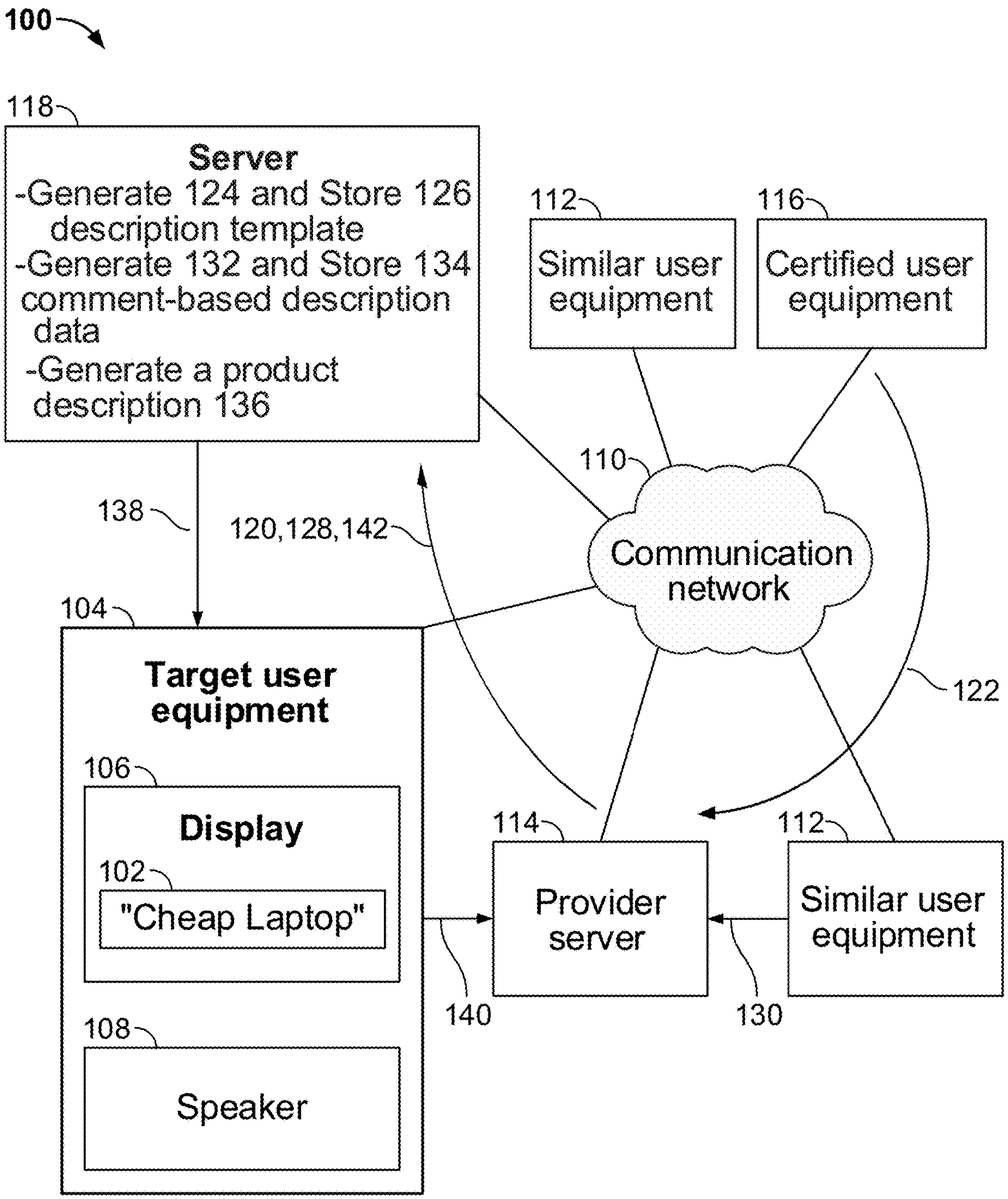
FIG. 1 is an illustrative block diagram showing a scenario for dynamically generating a product description, in accordance with some embodiments of the disclosure.

FIG. 1 illustrates an overview of a scenario in which a system 100 dynamically generates a product description 102 that is personalized for a target user account, in accordance with some embodiments of the disclosure. In particular, a scenario according to an embodiment involves three different parts: a first part relates to generating at least one product description template that needs to be populated; a second part relates to generating comment-based description data; and a third part relates to populating the product description template with comment-based description data to create the product description 102. The product description 102 is aimed at presenting a product of interest for a target user, using a target user account, with a customized description. In an embodiment, a product description is generated upon detection of an access request to the product of interest by the target user account. As the generation of the product description uses templates and comment-based description data, it can be automatically processed and tailor-made to fit the profile of the user of the target user account. Two different examples will be used: a product of interest that is a media asset (such as a series) and a product of interest that is an item to acquire (to purchase, to buy, or to rent).

System 100 includes a first computing device 104, which will be referred to as the "target user equipment", such as a smartphone, a laptop, a tablet, a smart TV, etc. that has various user interfaces configured to interact with one or more nearby users, and more particularly to the target user. The target user equipment 104 is configured to visually or audibly display the product description, by means of display 106 or speaker 108. System 100 also includes a communication network 110, such as the Internet and/or a local network; at least one second computing device 112 (referred to as "similar user equipment", with two of them in FIG. 1); at least one provider server 114; at least one third computing device 116 (referred to as "certified user equipment") and a server 118. Target user equipment 104, similar user equipment 112, provider server 114, certified user equipment 116 and server 118 are communicatively coupled to one another by way of communication network 110.

In an embodiment, server 118 obtains (120), from the provider server 114 and via the communication network 110, at least one of product description data or product comment data. The product description data and the product comment data may be related to the product of interest or to similar products. For instance, if the product of interest is a comedy series ("Young Sheldon"), a similar product may another comedy series ("Big Bang Theory"); if the product of interest is a laptop (MacBook Pro), a similar product may be another laptop (all the HP laptops). The product description data corresponds to information provided by a product provider (manufacturer, distributor, seller, etc.) while the product comment data corresponds to information input (122) by a certified user account of a set a certified user accounts, for instance by means of certified user equipment 116 via communication network 110. Provider server 114 may include a plurality of servers, and the servers may comprise databases, such as a manufacturer database, a distributor database, or a seller database. Server 118 generates (124), based on at least one of the product description data or the product comment data, a product description template. The product description template comprises at least one field to be populated. Server 118 then stores (126) the product description template in a memory.

In an embodiment, server 118 obtains (128), from the provider server 114 or any other server, and via the communication network 110, a first set of comment data originating from a first set of user accounts. Each user account of the first set of user accounts has a similarity score with the target user account that is above a similarity threshold. In other words, the user accounts of the first set of user accounts are considered as similar accounts to that of the target user account. The comment data of the first set of comment data are associated with the product of interest. Each comment data of the first set of data have been input (130) by means of the similar user equipment 112, for instance. This means that each comment data contains information (e.g., descriptive information) about the product of interest. Based on comment data of the first set of comment data, server 118 generates (132) comment-based description data and stores them (134) in a memory.

In an embodiment, server 118 generates (136), for aural or visual presentation, a product description for the target user account using the stored product description template and the stored comment-based description data. The product description may send (138), for instance to the target user equipment 104, the product description 102, such that it gets displayed. To generate the product description, server 118 retrieves from the memory a product description template and comment-based description data. Server 118 then populates the at least one field of the retrieved product description template based on the comment-based description data. The product description therefore depends directly from the first set of comment data, which comes from similar user accounts, that is to say liked-minded users. In particular, generating 136 the product description may be performed by server 118 in response to detecting by server 118 an access request to the product of interest. For instance, provider database 114 may receive (140) a request for access and forward (142) the information to the server 118.

Figure 2:
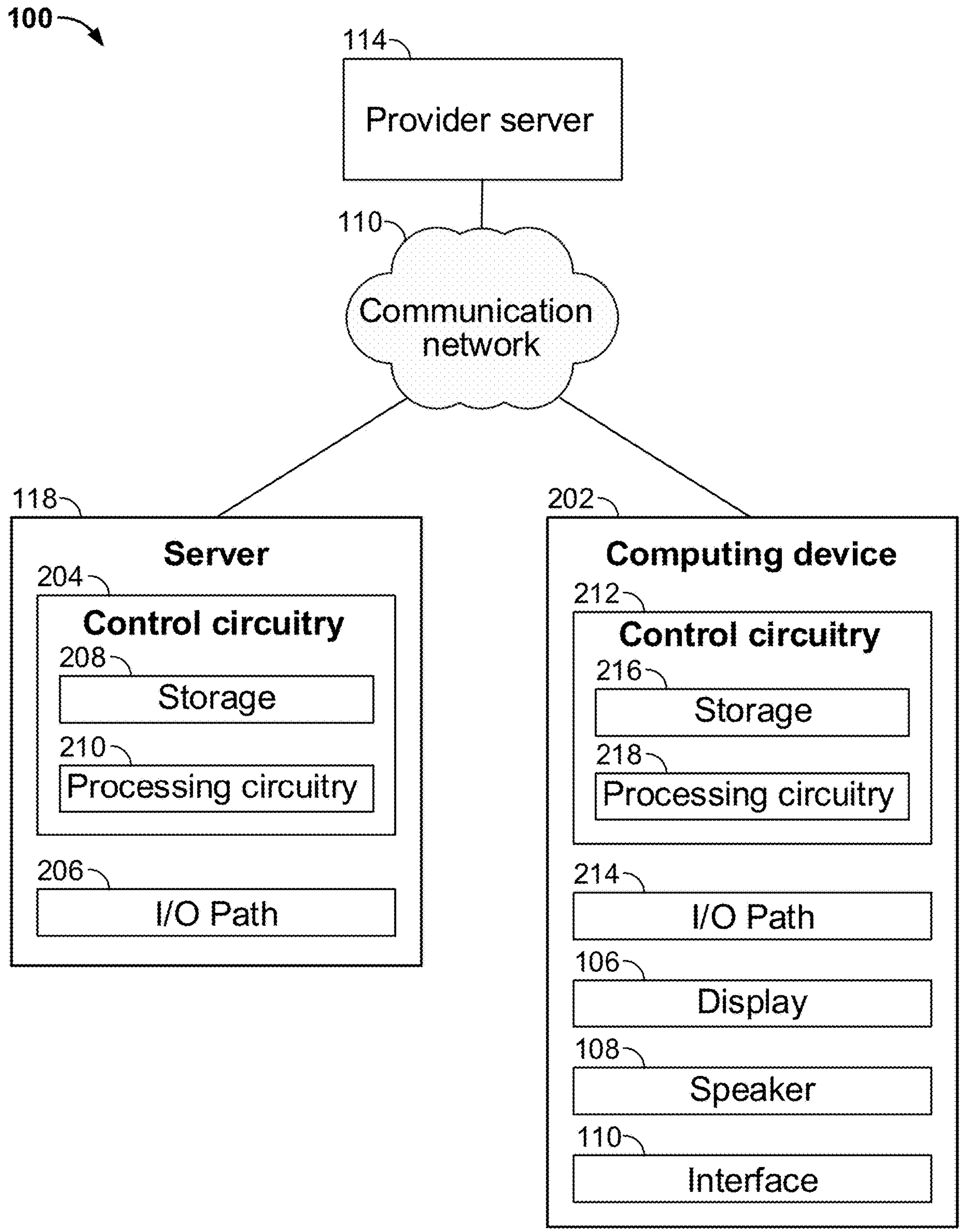
FIG. 2 is an illustrative block diagram showing some parts of a system for dynamically generating a product description, in accordance with some embodiments of the disclosure.

FIG. 2 is an illustrative block diagram showing some parts of an example of system 100 for dynamically generating a product description personalized for a target user account, in accordance with some embodiments of the disclosure. Although FIG. 2 shows system 100 as including a number and configuration of individual components, in some embodiments, any number of the components of system 100 may be combined and/or integrated as one device. System 100 includes the first computing device, the second computing device and the third computing device, which are represented as computing device 202 to avoid overcomplicating the drawings. However, system 100 may comprise a plurality of second computing devices (as illustrated in FIG. 1) and a plurality of third computing devices. System 100 also includes communication network 110, provider server 114, and server 118. Each of those elements is communicatively coupled to communication network 110, which may be the Internet or any other suitable network or group of networks. In some embodiments, system 100 excludes server 118 or provider server 114, and functionality that would otherwise be implemented by server 118 or provider server 114 is instead implemented by other components of system 100, such as computing device 202. In still other embodiments, server 118 works in conjunction with computing device 202 to implement certain functionality described herein in a distributed or cooperative manner.

Server 118 includes control circuitry 204 and input/output (hereinafter "I/O") path 206, and control circuitry 204 includes storage 208, such as a memory, and processing circuitry 210. Computing device 202, which may be a personal computer, a laptop computer, a tablet computer, a smartphone, a smart television, a smart speaker, or any other type of computing device, includes control circuitry 212, I/O path 214, display 106, a speaker 108, and user input interface 110, such as a keyboard, a tactile screen or a voice-user interface configured to receive natural language queries uttered by users in proximity to computing device 202. Control circuitry 212 includes storage 216 and processing circuitry 218. Control circuitry 204 and/or 212 may be based on any suitable processing circuitry such as processing circuitry 210 and/or 218. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). Provider server 114 comprises similar elements (not illustrated to avoid overcomplicating the drawing).

Each of storage 208, storage 216, and/or storages of other components of system 100 (e.g., storages of provider server 114, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 208, storage 216, and/or storages of other components of system 100 may be used to store various types of content, metadata, and or other types of data. Non-volatile memory may also be used (e.g., to launch a boot-up routine and other instructions). Cloud-based storage may be used to supplement storages 208, 216 or instead of storages 206, 216. In some embodiments, control circuitry 204 and/or 212 executes instructions for an application stored in memory (e.g., storage 208 and/or 216). Specifically, control circuitry 204 and/or 212 may be instructed by the application to perform the functions discussed herein. In some implementations, any action performed by control circuitry 204 and/or 212 may be based on instructions received from the application. For example, the application may be implemented as software or a set of executable instructions that may be stored in storage 208 and/or 216 and executed by control circuitry 204 and/or 212. In some embodiments, the application may be a client/server application where only a client application resides on computing device 202, and a server application resides on server 118.

The application may be implemented using any suitable architecture. For example, it may be a stand-alone application wholly implemented on computing device 202. In such an approach, instructions for the application are stored locally (e.g., in storage 216), and data for use by the application is downloaded on a periodic basis (e.g., from an out-of-band feed, from an Internet resource, or using another suitable approach). Control circuitry 212 may retrieve instructions for the application from storage and process the instructions to perform the functionality described herein. Based on the processed instructions, control circuitry 212 may determine what action to perform when input is received from user input interface 110.

In client/server-based embodiments, control circuitry 212 may include communication circuitry suitable for communicating with an application server (e.g., provider server 114, server 118), or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 110). In another example of a client/server-based application, control circuitry 212 runs a web browser that interprets web pages provided by a remote server (e.g., server 118, provider server 114). For example, the remote server may store the instructions for the application in a storage device. The remote server may process the stored instructions using circuitry (e.g., control circuitry 204) and/or generate displays. Computing device 202 may receive the displays generated by the remote server and may display the content of the displays locally via display 106. This way, the processing of the instructions is performed remotely (e.g., by server 118) while the resulting displays, such as the display windows described elsewhere herein, are provided locally on computing device 202. Computing device 202 may receive inputs from the user via input interface 110 and transmit those inputs to the remote server for processing and generating the corresponding displays.

A user may send instructions to control circuitry 204 and/or 212 using user input interface 110. User input interface 110 may be any suitable user interface, such as a remote control, trackball, keypad, keyboard, touchscreen, touchpad, stylus input, joystick, voice recognition interface, gaming controller, or other user input interfaces. User input interface 110 may be integrated with or combined with display 106, which may be a monitor, a television, a liquid crystal display (LCD), an electronic ink display, or any other equipment suitable for displaying visual images.

Server 118 and computing device 202 may transmit and receive content and data via I/O path 206 and 214, respectively. For instance, I/O path 206 and/or I/O path 214 may include a communication port configured to transmit and/or receive (for instance to and/or from provider server (114), via communication network 110, content item identifiers, natural language queries, and/or other data. Control circuitry 204, 212 may be used to send and receive commands, requests, and other suitable data using I/O paths 206, 214.

Figure 3:
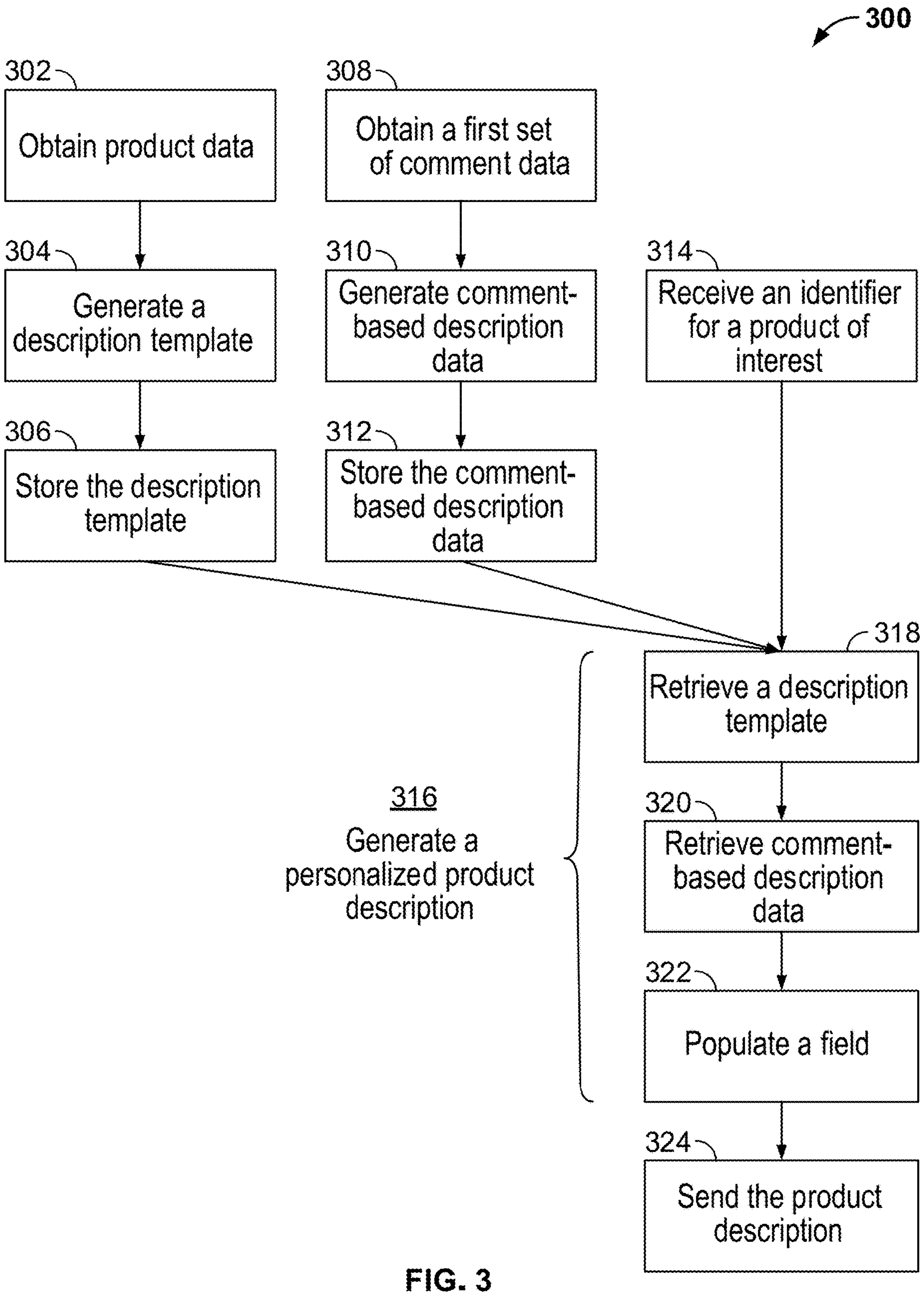
FIG. 3 depicts an illustrative flowchart of a process for dynamically generating a product description, in accordance with some embodiments of the disclosure.

Having described system 100, reference is now made to FIG. 3, which depicts an illustrative flowchart of a process 300 for generating a product description of a product of interest, which is personalized for a target user account. Process 300 may be implemented by system 100, in accordance with some embodiments of the disclosure. In various embodiments, individual steps of process 300, or any process described herein, may be implemented by one or more components of system 100. Although the present disclosure may describe certain steps of process 300 (and of other processes described herein) as being implemented by certain components of system 100, such as control circuitry 204 of server 118 this is for purposes of illustration only, and other components of system 100 may implement those steps instead.

At 302, control circuitry 204 obtains at least one product description data associated with a product or product comment data associated with a product, both of them being referred to as "product data". Product data may be received, via the communication network 110, from the provider server 114. A product here may be the product of interest (i.e., the product for which a personalized description is to be generated) or any product similar to it. It may be a product that shares a similarity index with the product of interest. The similarity index may take into account metadata associated with the product, such as the label of the product or its classification (categories and/or subcategories). For instance, when the product of interest is a MacBook Pro (thus an item to purchase), a label of the product may be "laptop". The similar products may comprise any other laptops. The category may be "Apple product" and subcategories may be "MacBook", then "MacBook Pro"/ "MacBook Air", and any product in the subcategories may be considered as well. When the product of interest is "Young Sheldon" (thus a media asset), a label of the product may be "series". The similar products may comprise any series. The categories or subcategories may be "comedy", "spin-off", "U.S." and any product in the subcategories may be considered as well.

The product description data are data provided by the product provider (Apple or Warner Bros, in the previous examples) and/or the merchant or distributor (Amazon or Netflix in the previous examples). Therefore, the product description data may be obtained from several provider servers 114, which may comprise merchant databases or distributor databases.

The product comment data are data provided by user accounts. More specifically, the users are chosen amongst a set of certified user accounts. By certified, it is meant that those user accounts are classified as inputting data that is high-quality and accurate. For instance, a certified user account is known for providing comment data that is grammatically correct and that present a good syntax to create coherent sentences. The set of certified user accounts may be determined by peer approbation. Typically, the product comment data are input in a user's review section of a product or on a forum-like website. The product comment data may be obtained from several provider servers 114, for instance a provider database, a merchant database, or a third-party database, such as the server of a fan website, a forum website, etc.

Each product data may be comprised of a plurality of objects, retrieved in or converted to in a text form. An object may be, for instance, a sentence.

In an embodiment, control circuitry 204 retrieves only product description data or only product comment data. In another embodiment, control circuitry 204 retrieves both. The amount of data may be considerable. For instance, control circuitry 204 may obtain thousands of product description data and thousands of product comment data.

At 304, control circuitry 204 processes the product data (either one or both of the product description data and the product comment data) to generate a product description template. A product description template comprises one or several fields (e.g., blank fields) that need to be populated with information related to the product of interest. The fields are linked together by a structure, the structure being, for instance, extracted from product data. A plurality of description templates may be generated. For example, one object determined from the product data may be processed to generate one template. More generally, a product data that comprises a certain amount of objects may lead to the generation of as many objects. Conversely, objects can be concatenated to generate a single template. More details about 304 are discussed below.

At 306, control circuitry 204 stores the product description template in the memory (e.g., storage 208). Typically, a plurality of product description templates are stored, such that a database of description templates is created and/or maintained.

Steps 302, 304 and 306 may be carried out regularly (for instance, every week, every month, etc.) or when a new product description data or product comment data is input on the provider server 114. This allows for keeping up-to-date templates (to account for the evolution of language, etc.). To avoid processing data that were already processed, only new product data may be obtained to generate a product description template.

At 308, control circuitry 204 obtains, via the communication network 110, a first set of comment data associated with the product of interest. The comment data may be received from the provider server 114 or any source such as disclosed previously for the product data, except that the comment data relates this time to the product of interest. The first set of comment data originates from a first set of user accounts wherein each has a similarity score with the target user account that is above a similarity threshold (and herein referred to as a "similar user account"). A similarity threshold may take into account the target user account profiles and compare it with other user account profile. A recommender system using any of a collaborative filter, content-based filtering, and a knowledge-based system may be suitable to determine the first set of user accounts. The comment data typically consists of comment data input by a similar user account. For example, a similar user account may post online a comment about a laptop. That comment forms a comment data. Comment data may be comprised of a plurality of objects, retrieved in or converted to a text form. An object may be, for instance, a sentence. A comment data may contain a plurality of objects (for example several sentences). As an illustration only, control circuitry 204 may obtain thousands of comment data.

At 310, control circuitry 204 processes comment data from the first set of comment data to generate comment-based description data. The comment-based description data may consist of isolated concepts of objects of the comment data. In an embodiment, each comment data may lead to the generation of at least one comment-based description data. For example, one object (e.g., a sentence such as "The battery of that cheap laptop is exceptional") determined from the comment data may be processed to generate one or more comment-based description data (e.g., "exceptional battery" and "cheap laptop"-see later for the form of the comment-base description data). More generally, a comment data that comprises a certain amount of objects may lead to the generation of at least as many comment-based description data. More details about 310 are described below.

At 312, control circuitry 204 stores the comment-based description data in the memory (e.g., storage 208). Typically, a plurality of comment-based description data is stored, such that a database of comment-based description data is created or maintained.

At 314, control circuitry 204 may receive an identifier for a product of interest. At 316, in response to receiving the identifier, control circuitry may generate, for aural or visual presentation, a product description, for the target user account, of the product of interest. Control circuitry generating, at 316, comprises control circuitry retrieving, at 318, the product description template from the memory (e.g., storage 208), retrieving, at 320, comment-based description data from the memory (e.g., storage 208), and populating, at 322, the one or more fields of the retrieved product description template based on the retrieved comment-based description data. In an embodiment, control circuitry 204 retrieving, at 318, involves control circuitry 204 retrieving a product description template from the plurality of description templates stored. At 324, control circuitry 204 may send the product description to the provider server 114 which will in turn send it to the target user equipment 104 to be displayed thereon.

Figure 4:
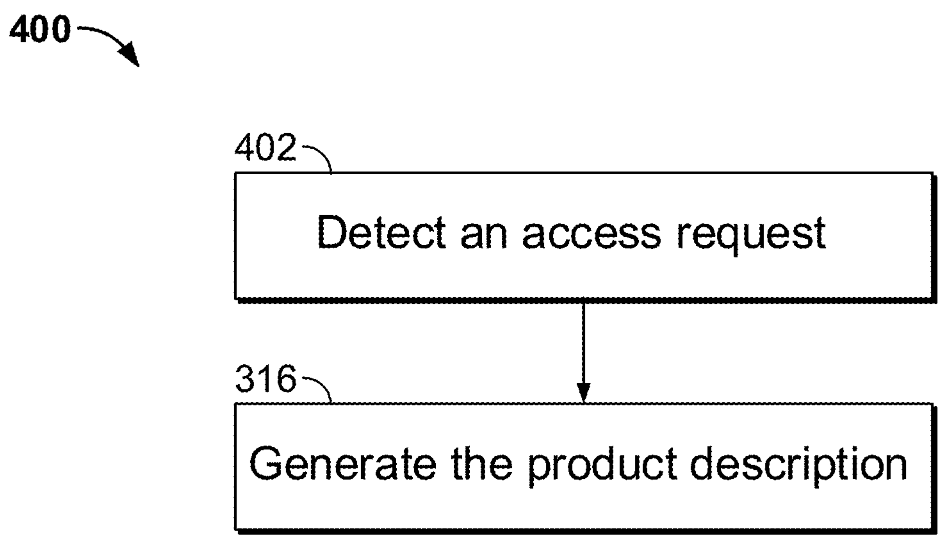
FIG. 4 depicts an illustrative flowchart of a process for dynamically generating a product description, wherein generating a product description is performed in response to detecting an access request to the product of interest, in accordance with some embodiments of the disclosure.

In reference to FIG. 4, which depicts an illustrative flowchart of process 400, generating, at 316, may be performed in response to control circuitry 204 detecting, at 402, from the target user account, an access request to the product of interest. Control circuitry 204 detecting, at 402, may be performed by control circuitry 204 receiving a notification from the provider server 114 that the target user account has requested access to the product of interest on the provider server 114. For instance, the target user account may click on a link relating to the product of interest. In this way the product description is generated when the target user account needs it: this enables using the most appropriate description template and the most appropriate comment-based description data.

Figure 5:
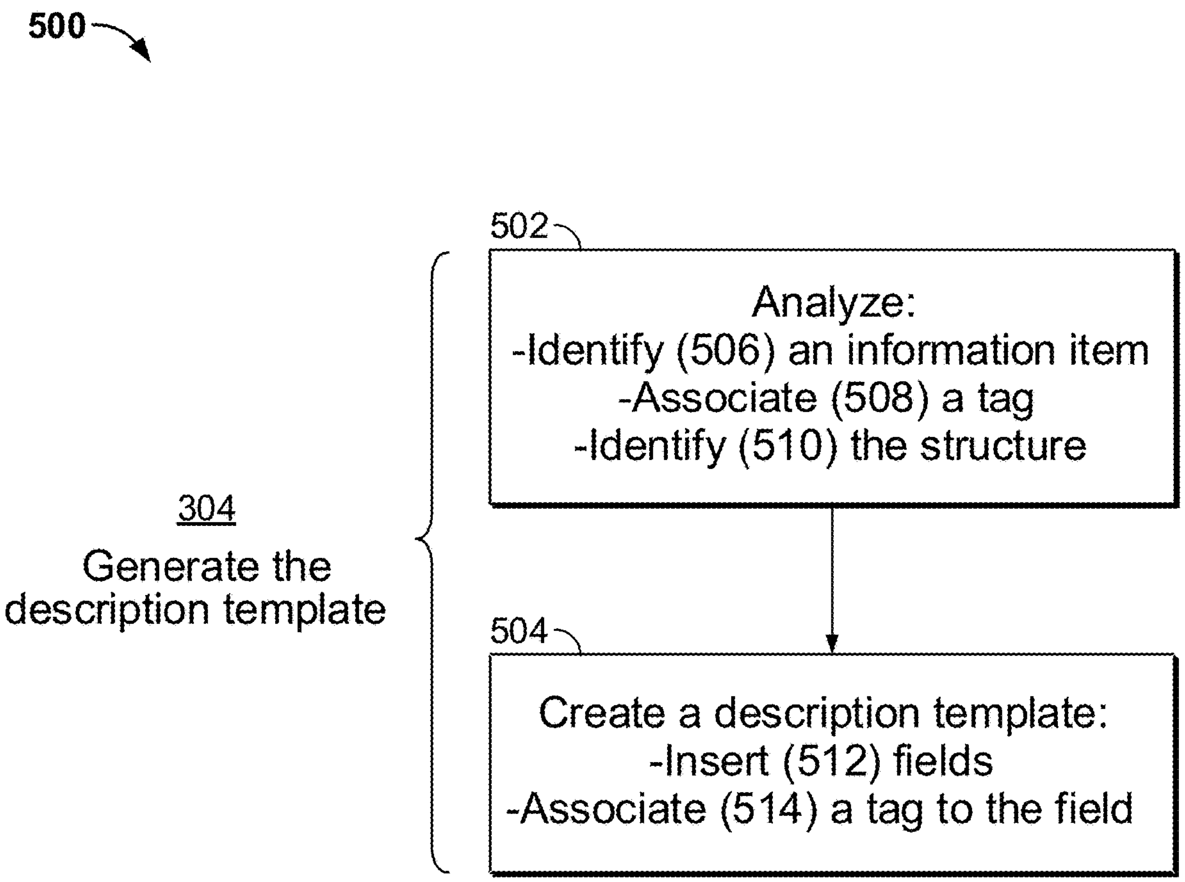
FIG. 5 depicts an illustrative flowchart of a process for dynamically generating a product description, in accordance with some embodiments of the disclosure.

In reference to FIGS. 5, 6, 7, and 8, more precision about the description template will be given. FIG. 5 depicts a flowchart of process 500. Control circuitry 204 generating, at 304, the product description template may comprise the control circuitry 204 analyzing, at 502, product description data and/or product comment data and creating 504, based on that analyzing, the product description template. Analyzing, at 502, may comprise, for each product data (production description data and product comment data) control circuitry 204 identifying, at 506, an information item in the product data and associating 508 that information item with a tag. Different tag labels may be used, in order to cover the nature of the product, product name, the features, the quality, etc. For instance, tag labels may be "PRODUCT_NAME", "ADJECTIVE", "FEATURE", "NATURE", "NAME", "ROLE", etc. In addition, control circuitry 204 analyzing, at 502, comprises control circuitry 204 identifying, at 510, the structure of the product data (e.g., a sentence). The structure is formed by the connectors around the information item, which make the product data (e.g., a sentence) a grammatically and syntactically correct sentence. The information item associated with a tag then becomes a field to be populated. Therefore, control circuitry 204 creating, at 504, typically comprises control circuitry 204 inserting, at 512, a field where there is an information item. Control circuitry 204 inserting, at 512, a field may comprise control circuitry 204 retrieving (as it is or slightly altered) the structure of a product data and replacing the tagged information item by blank fields. Creating, at 504, also comprises control circuitry associating, at 514, a tag to the field. In an embodiment, the tag is the same tag as the tag associated with the information item originally identified in the product data that led to the creation of the product description template.

FIG. 6 shows a chart 600 illustrating product description data and product comment data obtained at 302 and analyzed at 502. Column "input" 602 represents the product comment data, as obtained from the provider server 114, for instance. Some metadata may be associated with the input 602, such as an Input ID 604, which enables unique identification of each product data, and an origin 606 which enables tracing the input for further processing (which certified user, which provider, etc.). Column "tagged sentence" 608 shows how an product data is processed by control circuitry 204. For instance, product description data (input 602) may be "Dell Inspiron has great battery life". The information item identified is "Dell Inspiron", "great" and "battery life" with respective tags PRODUCT_NAME, ADJECTIVE, and FEATURE, and the structure is "[ . . . ] has [ . . . ]". The tagged sentence, which shows the structure and the tags associated with the information item may be: <Dell Inspiron> (PRODUCT_NAME) has <great> (ADJECTIVE)<battery life> (FEATURE).

Analyzing product description data or product comment data may be performed using at least one of part-of-speech tagging, dependency parsing, or domain knowledge. Those techniques enables identification of information item and the structure within every product data.

Once analyzing 502 has been performed, control circuitry 204 creates the description template or a plurality of description templates. A description template is comprised of a structure identified at 510 and at least one field linked to a tag associated at 508 and 514. A field associated with a tag may be populated with a comment-based data associated with the same tag.

FIG. 7 shows a database 700 comprising a plurality of description templates that can be stored at 306 in storage 208 of the server 118. Database 700 includes at least the description templates 702 and template IDs 704 to uniquely identify each description template.

Figure 8:
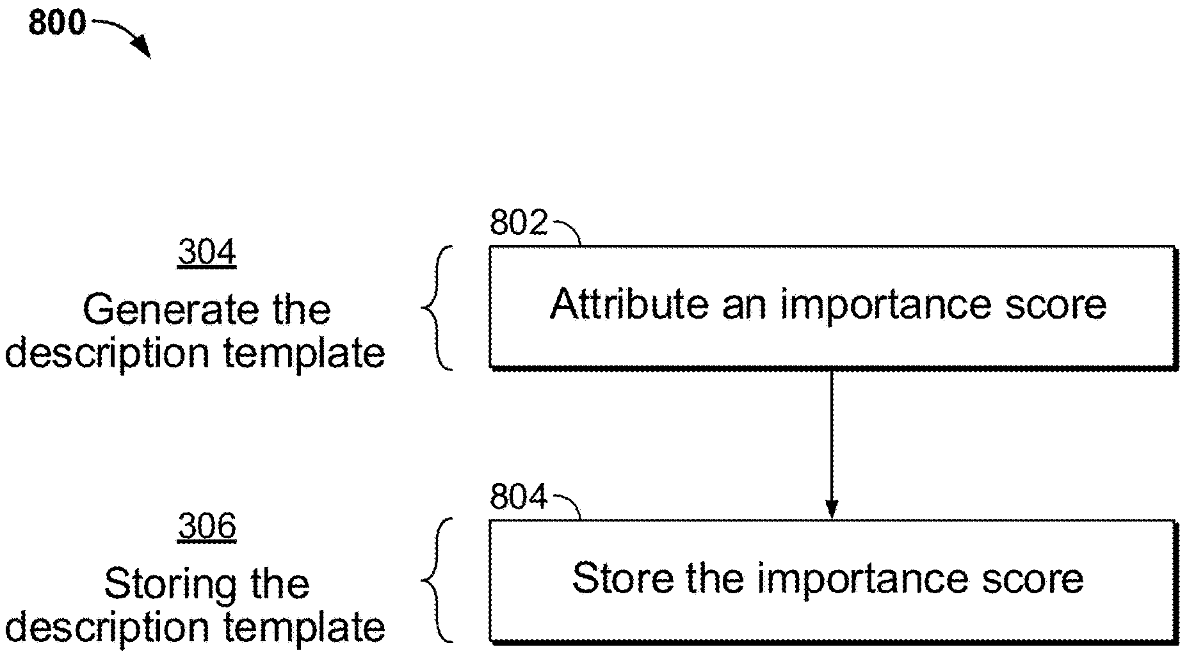
FIG. 8 depicts an illustrative flowchart representing an importance score in the generation of the description template, in accordance with some embodiments of the disclosure.

In an embodiment further shown in FIG. 7 and in FIG. 8 which depicts a flowchart 800, generating, at 304, a product description template may comprise attributing 802, by control circuitry 204, an importance score 706 to the product description template 702. Control circuitry 204 may then store 804 the importance score 706 along with the product description template 702. The importance score may be attributed based on the tags or the structure. For instance, a tag indicating "NATURE" means that the description template is aimed at introducing the product and therefore is key in a description; importance 706 may be "1" (see Temp4 in FIG. 7). For instance, a structure indicating a casual sentence is aimed at convincing the user and is preferably put at the end of the description; importance 706 may be "3" (see Temp2 and Temp3 on FIG. 7). The same importance can be attributed to several description templates. A similar importance may also signify that the meaning of the description template is identical (see Temp2 and Temp3 on FIG. 7 for instance). As will be described below, the importance score 706 is used to generate a more complex product description: as one description template usually enables the expression of a single idea, a product description may include several description templates concatenated together, to form a bundle of sentences.

Figure 9:
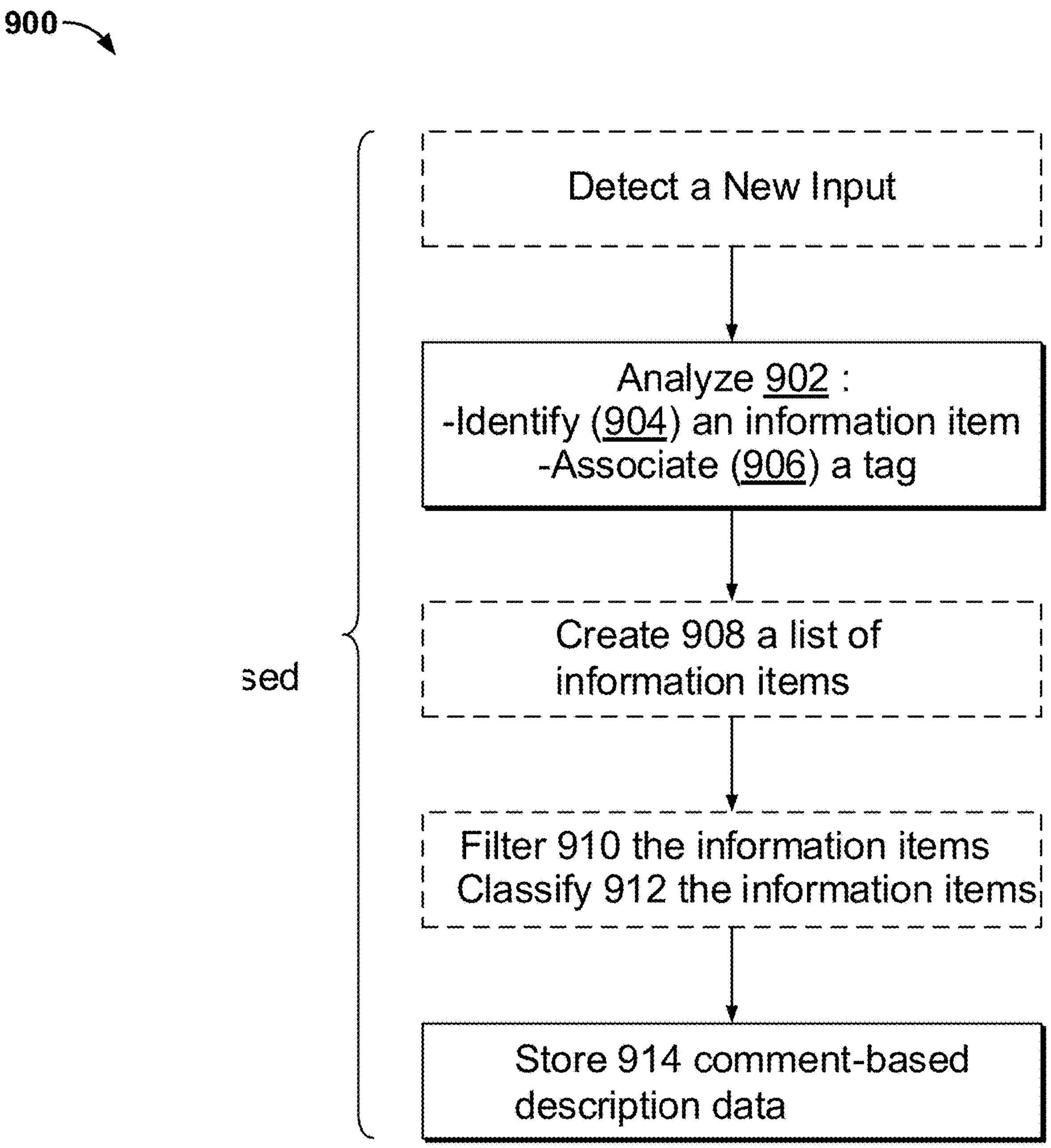
FIG. 9 depicts an illustrative flowchart representing in more detail generating comment-based description data, in accordance with some embodiments of the disclosure.

In reference to FIG. 9 depicting a flowchart of process 900, more precision about the comment-based description data will be given. Control circuitry 204 generating, at 310, comment-based description data may comprise control circuitry 204 analyzing, at 902, comment data of the first set of comment data. The comment data are associated with the product of interest and contains information that describes the product of interest, in one way or another. Control circuitry 204 analyzing, at 902, comprises, for each comment data of the first set of comment data, control circuitry 204 identifying, at 904, at least one information item in the comment data, and, at 906, associating a tag to the information item. A plurality of information item can be associated with a same tag. In that case, at 908, control circuitry 204 may create a list of information item associated with the same tag. The information item and the associated tag form a comment-based data. In an embodiment, control circuitry 204 filters 910 the information items by means of a sentiment analyzer or a similarity detector and classifies 912 them accordingly. For instance, the classification can include happy, sad, cheerful, spoiler, background, etc. At 914, control circuitry 204 stores the comment-based description data, that is to say an information item with its associated tag, in the memory (e.g., storage 208). A plurality of comment-based description data is stored, such that a database is created.

Figure 10:
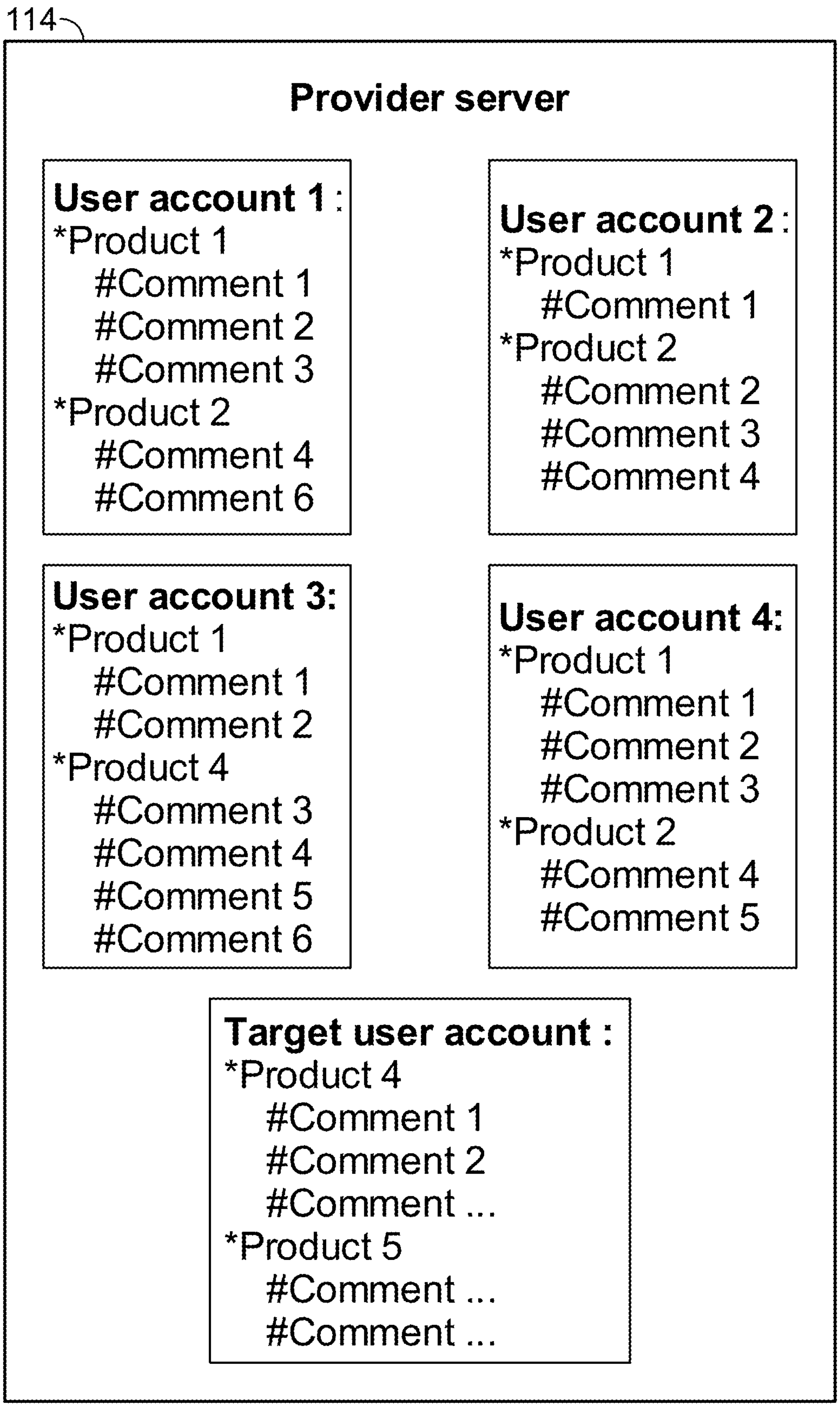
FIG. 10 depicts an illustrative representation of a provider server storing comment data, in accordance with some embodiments of the disclosure.

FIG. 10 illustrates a provider server 114 storing comment data. Those comment data were input by different similar user accounts, about different products. For instance, user account 3 has input two comment data about product 1 and four comment data about product 2. Although only comment data related to the product of interest are useful to generate a production description for such product, it is efficient to process as many comments about as many products as possible, in order to build a database of comment-based description data. Depending on the product of interest, only the comment-based description data associated with the product of interest are used to populate the fields of the description template. For instance, say the product of interest is product 1 (MacBook Pro); say product 2 (HP laptop) has the same nature as product 1, and product 4 (a shovel) is unrelated; say a similarity threshold is defined as having commented on at least on two products of the nature of products 1 and 2 (laptop). In that case, only user accounts 1, 2 and 4 match the criterion of the similarity threshold. As product 1 is the product of interest, comments #1, #2, and #3 of user account 1, comment #1 of user account 2 and comments #1 and #2 of the user account 3 are part of the first set of comment data.

Those comment data are obtained by control circuitry 204 at 308. As noted previously, other comment data may be retrieved at the same time, so that the database of comment-based description data is already existing when control circuitry 204 is solicited to generate 316 the personalized product description.

FIG. 11 shows a chart 1100 illustrating comment data obtained at 308 and analyzed at 902. Column "input" 1102 represents the comment data, as obtained from the provider server 114, for instance. Some metadata may be associated with the input 1102, such as an input ID 1104, which enables unique identification of each comment data, an origin 1106 which enables tracing the input for further processing, and a date 1110 corresponding to an input date of the comment data. The date 1110 may be used to perform a continuous or quasi-continuous obtention of comment data without having to re-obtain all the comment data of the first set of user accounts. It suffices to retrieve comment data that have a date posterior to the date of the latest step of retrieving comment data. Column "tagged sentence" 1108 shows how a comment data is processed by control circuitry 204. For instance, comment data (input 1102) may be "I like the beautiful keyboard". The information item identified is "beautiful" and "keyboard" with respective tags ADJECTIVE and FEATURE.

Analyzing comment data may be performed using at least one of part-of-speech tagging, dependency parsing, or domain knowledge. Those techniques enables identification of information item within every comment data.

Figure 12:
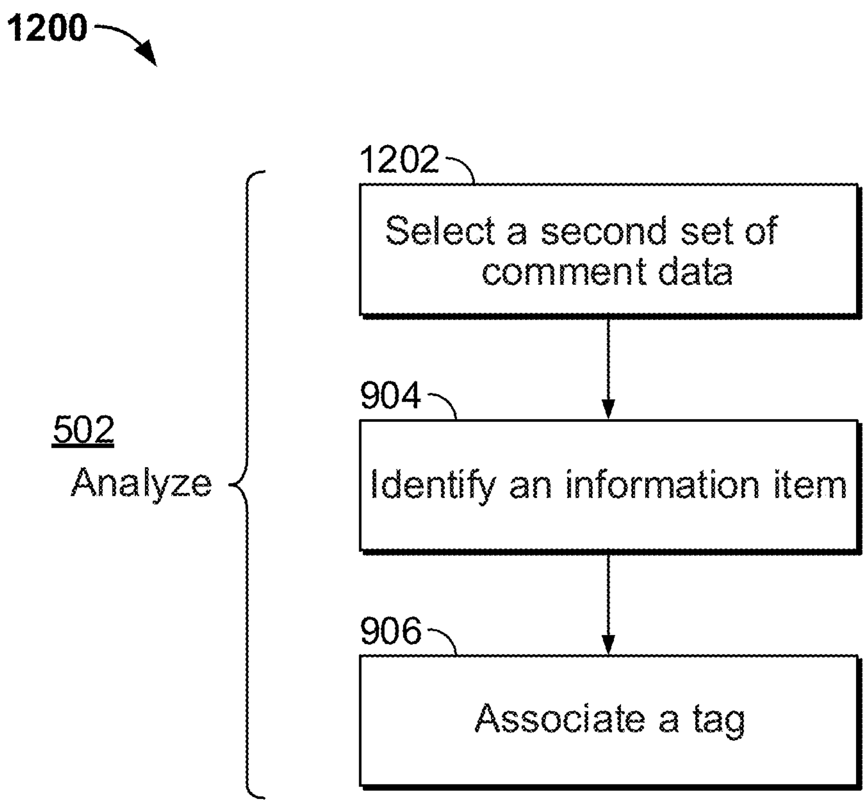
FIG. 12 depicts an illustrative flowchart representing a selection of comment data, in accordance with some embodiments of the disclosure.

In an embodiment, not all the comment data from the first set of users are analyzed at 502. In reference to FIG. 12 illustrating flowchart 1200, control circuitry 204 analyzing comprises control circuitry 204 selecting, at 1202, a second set of comment data from the first set of comment data. Then, control circuitry 204, identifying, at 904, associating, at 906, and storing at 914, as disclosed previously in relation to FIG. 9 are carried out with comment data from the second set of comment data. Selecting 1202 is performed based on a priority score attributed to each comment data. For instance, the priority score may include at least one of number of likes of the comment data, number of dislikes of the comment data, number of shares of the comment data, number of replies to the comment data. This is aimed at avoiding processing comment data that would provide little or no added value to the product description.

Figure 13:
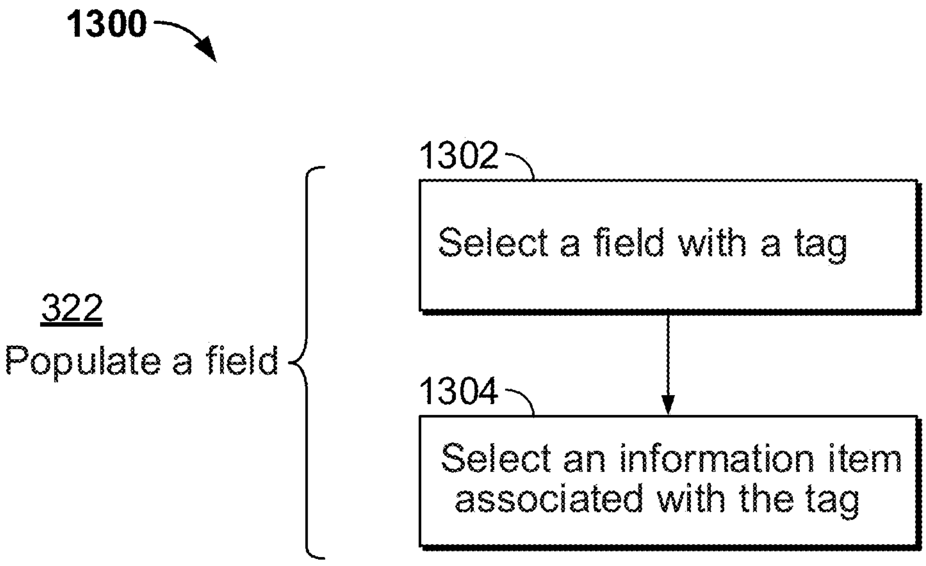
FIG. 13 depicts an illustrative flowchart representing a selection of a field, in accordance with some embodiments of the disclosure.

In reference to FIG. 13, which depicts a flowchart of process 1300, more precision about populating, at 322, at least one field of a retrieved product description template using retrieved comment-based description data will be given. At 1302, control circuitry 204 selects a field in the retrieved product description template. The field is associated with a tag, and at 1304, control circuitry 204 selects an information item that is associated with the same tag, in order to populate the field. In a case where a list of information items associated with a same tag was created, at 908, control circuitry 204 selecting, at 1304, may comprise control circuitry 204 selecting from the list information items amongst all the information items associated with the same tag.

Figure 14:
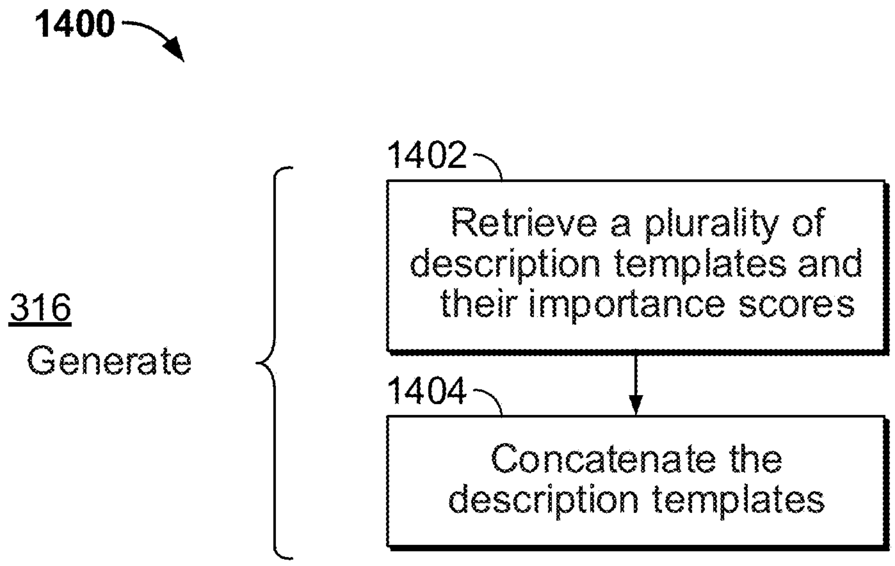
FIG. 14 depicts an illustrative flowchart representing a concatenation of description templates, in accordance with some embodiments of the disclosure.

FIG. 14 depicts a flowchart 1400 disclosing an embodiment using an importance score, in relation to FIG. 8. At 802, an importance score 706 was attributed to the description template. Generating 316 a personalized product description comprises retrieving 1402 a plurality of product description templates, along with the respective scores. The retrieved product description templates have a different importance scores. At 1404, control circuitry 204 concatenates the plurality (or at least two of the plurality) of product description templates. This enables creation of a more complex template, with different sentences for example. In order to create a logical progression, the concatenation is carried out with a decreasing importance score. With the examples of FIG. 7, a concatenated description template may be: "<PRODUCT_NAME> is a <ADJECTIVE><NATURE>. <PRODUCT_NAME> has <ADJECTIVE_LIST><FEATURE>. <ADJECTIVE_LIST><FEATURE> is worth every penny." The characteristics which are more important appear first, and the persuasive part appears last. Alternatively, concatenating, at 1404, may be performed after the description templates are populated at 322.

Figure 15:
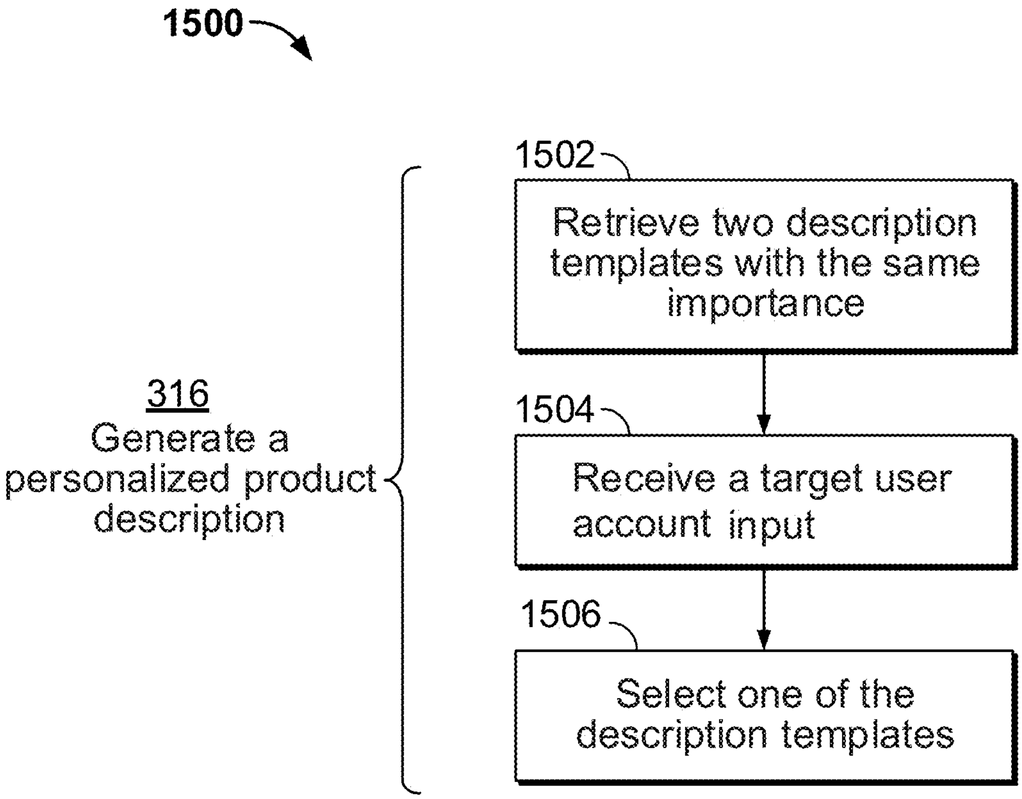
FIG. 15 depicts an illustrative flowchart representing a selection of a description template, in accordance with some embodiments of the disclosure.

FIG. 15 depicts a flowchart 1500 disclosing an embodiment in which several description templates have the same importance score. Generating 316 may comprise retrieving 1502 two product description templates that have the same importance. For instance, Temp2 and Temp3 of FIG. 7 have the same importance. They both express the same concept, and therefore it is preferable that the concatenated template does not include both of them. At 1504, control circuitry 204 receives a target user account input and, at 1506, selects one of the description templates based on the target user account input. As the personalized description is generated automatically, the target user input may be an input previously made by the target user account and unrelated to the generation of the product description. For instance, the input may be a comment data about a product other than the product of interest, wherein the comment data contained a similar formulation to that of one of the description templates. Using comment data stored on the provider server 114 depicted on FIG. 10, control circuitry may receive comment data from the target user account and determine that comment 2 about Product 4 reads "cost". Therefore, control circuitry 204 may choose Temp3 of FIG. 7 over Temp2 because the former contains the same word and the latter doesn't.

Figure 16:
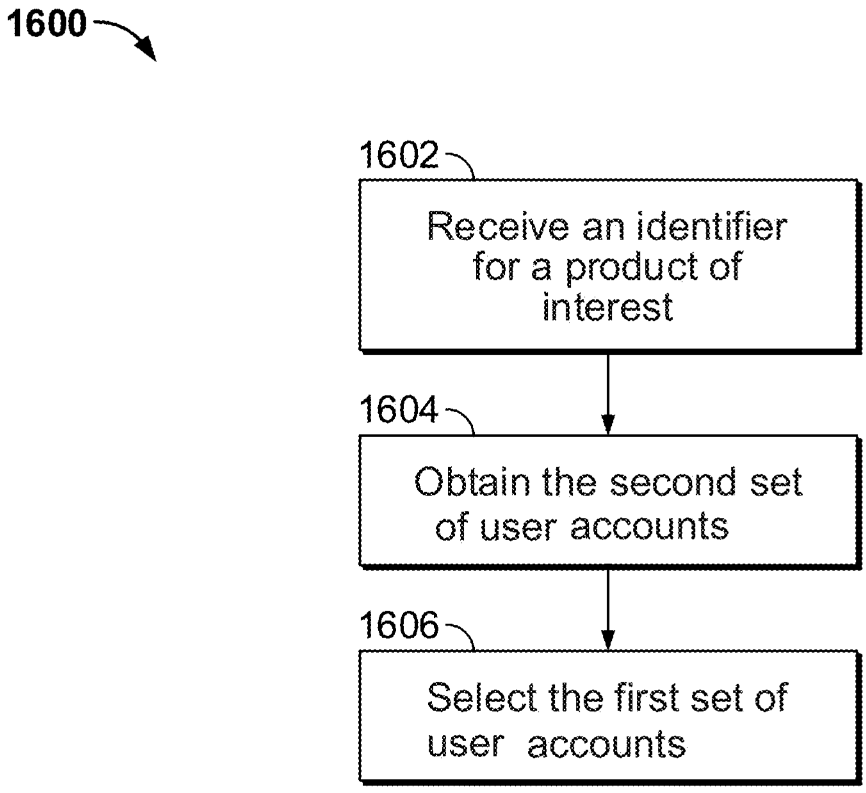
FIG. 16 depicts an illustrative flowchart of a process involving a recommender system to identify similar user accounts, in accordance with some embodiments of the disclosure.

In reference to FIG. 16, flowchart 1600 illustrates how the first set of user accounts may be obtained. At 1602, control circuitry 204 receives an identifier for a product of interest.

The identifier is sent by a recommender system, which uses a second set of user accounts. The recommender system may send a plurality of products of interest. The recommender system may be implemented at the provider server 114. The second set of user accounts includes user accounts that are similar to the target user account (referred to as similar user accounts). The recommender system may use a similarity score to determine the second set of user accounts. At 1604, control circuitry retrieves the second set of user accounts and, at 1606, selects the first set of user accounts amongst the second set of user accounts. Selecting 1606 may be performed using at least one of similarity score between the target user account and a similar user account above the threshold, number of comment data made by a similar user account, an engagement value of the target user account with respect to the product of interest, etc.

In some embodiments, populating the field of the description template is performed using a specific selection of comment-based description data. In one embodiment, the specific selection takes into account date 1110 of the comment data, as shown in FIG. 11, so that the product description is up-to-date. More specifically, only comment-based description data based on comment data input after a given date may be used. The given date may be a date at which the target user account consulted the product of interest on the provider server 114, for instance. In one embodiment, the specific selection takes into account an engagement value of the target user account with respect to the product of interest is taken into account. For instance, if the product of interest is a media asset such as a series, the engagement value may be the completion rate of the series. In this case, as the target user account already has some knowledge about the product of interest, a generic description can be avoided to focus on an aspect more relevant to the target user account. If the product of interest is an item to purchase, the engagement value may be the number of times the target user account has accessed the web page of the product of interest or the time spent on that web page or any other related page (forum, etc.).

Figure 17:
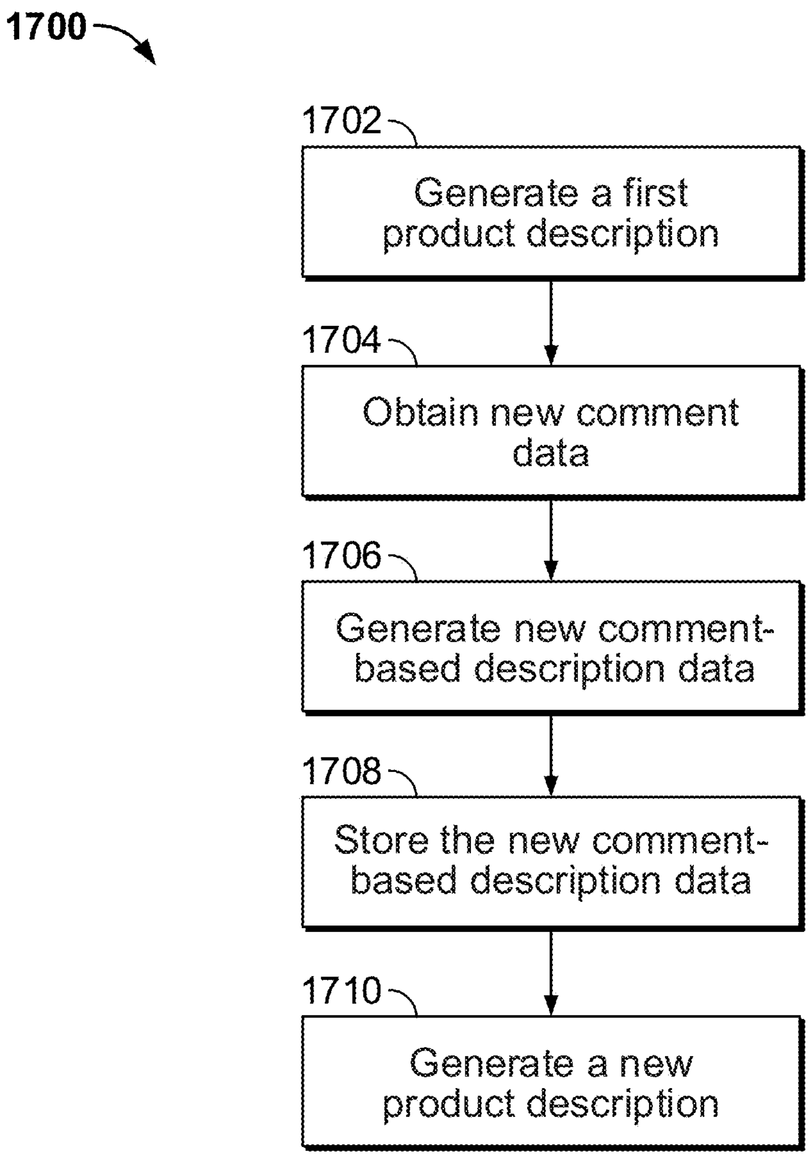
FIG. 17 depicts an illustrative flowchart of a process involving an update of a product description, in accordance with some embodiments of the disclosure.

Given that the value of the similarity score may evolve over time, and that the first set of comment data may evolve over time, two product descriptions generated for the same product of interest and for the same target user account, at different times, may be different. FIG. 17 depicts a flowchart 1700 illustrating the generation of two product descriptions. For instance, if, at a certain date, a first product description was generated, at 1702, in accordance with process 300 for instance, control circuitry 204 may obtain, at 1704 new comment data from the first set of user accounts. The new comment data were either input after the given time or originate from user accounts that are newly included in the first set of user account (because of a change in the similar score). For instance, if the target user account starts browsing a specific type of product, the similarity score will reflect that change in profile, and some user accounts that were considered as similar (e.g., above the similarity threshold) will cease to be, and some user accounts that were not considered as similar (e.g., below the similarity threshold) will be considered as similar (e.g., above the similarity threshold). The rest of the process 1700 is similar to that of FIG. 3. At 1706, control circuitry 204 generates new comment-based description data and, at 1708, stores the new comment-based description data in the memory. At 1710, control circuitry generates a new product description based on the new comment-based description data. In one embodiment, the new product description is based only on new comment-based description data. In another embodiment, the new product description is based on comment-based description data used to generate the first product description and based on the new comment-based description data. To shorten the processing time and decrease the required resources at the server 118, the new product description may be based on the first product description, which is altered using new comment-based description data. The new product description that is to be aurally or visually presented to the target user account is thus highly consistent with the last evolution of the target user account profile.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of this disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, using input/output circuitry, from at least one device, a plurality of comments associated with a product listing;

generating, by a processor, a tagged version of each comment of the plurality of comments by associating a tag from a plurality of tags with information items of the plurality of comments, wherein the associating is performed by the processor using at least one of: (a) a part-of-speech tagging technique, (b) a dependency parsing technique, or (c) a domain knowledge analysis technique;

storing, in a comment database, tagged versions of the plurality of comments;

receiving, by input/output circuitry, a request to access a page for viewing the product listing, wherein the request is associated with a user account;

generating, by the processor, a description for the product listing by:

accessing, from a memory, a description template that comprises a plurality of modifiable fields, wherein each modifiable field of the plurality of modifiable fields is linked to a respective tag from the plurality of tags;

identifying, for each respective modifiable field of the plurality of modifiable fields, a respective plurality of information items from the comment database associated with a tag matching the respective tag; and automatically populating each respective modifiable field of the plurality of modifiable fields with a respective information item from the comment database by selecting, by the processor, the respective information item from the respective plurality of information items based on an engagement value of the user account associated with the product listing; and generating, using input/output circuitry, for display the description for the product listing.

2. The method of claim 1, wherein each tag of the plurality of tags comprises information related to a type of information item to be used in populating a modifiable field.

3. The method of claim 1, wherein the description template comprises at least one complete sentence formed by the plurality of modifiable fields combined with a series of connecting words or phrases.

4. The method of claim 1, wherein the accessing, from the memory, the description template that comprises the plurality of modifiable fields further comprises:

accessing, from the memory, a plurality of description templates corresponding to the product listing; and selecting the description template from the plurality of description templates based on an importance score associated with the description template.

5. The method of claim 1, wherein the generating, by the processor, the description for the product listing further comprises:

accessing, from the memory, multiple description templates associated with the product listing; and concatenating the multiple description templates associated with the product listing into a singular description for the product listing which comprises one or more paragraphs related to the product listing.

6. The method of claim 5, wherein the concatenating the multiple description templates associated with the product listing into the singular description for the product listing further comprises:

accessing, from the memory, importance scores associated with each respective description template of the multiple description templates; and concatenating the multiple description templates associated with the product listing into the singular description such that the ordering of the multiple description templates within the singular description for the product listing is based on the importance scores associated with each respective description template.

7. The method of claim 1, wherein the description template corresponds to the product listing, and wherein the description template is generated by processing descriptions associated with a plurality of similar product listings.

8. The method of claim 1, further comprising:

identifying metadata associated with the plurality of comments, wherein the identified metadata includes identification of a device that each comment was received from and a respective date specifying when each comment was received; and storing, in the comment database, the plurality of comments and the identified metadata associated with the plurality of comments, wherein the selecting the respective information item is further based on the respective date associated with the respective information item.

9. The method of claim 1, wherein the respective information item comprises at least one of a word or a phrase.

10. A system comprising:

a memory;

input/output circuitry configured to:

receive, from at least one device, a plurality of comments associated with a product listing;

control circuitry configured to:

generate a tagged version of each comment of the plurality of comments by associating a tag from a plurality of tags with words or phrases of the plurality of comments, wherein the associating is performed by the control circuitry using at least one of: (a) a part-of-speech tagging technique, (b) a dependency parsing technique, or (c) a domain knowledge analysis technique;

store, in a comment database, tagged versions of the plurality of comments;

receive, by the input/output circuitry, a request to access a page for viewing the product listing, wherein the request is associated with a user account;

generate a description for the product listing by:

accessing, from the memory, a description template that comprises a plurality of modifiable fields, wherein each modifiable field of the plurality of modifiable fields is linked to a respective tag from the plurality of tags;

identifying, for each respective modifiable field of the plurality of modifiable fields, a respective plurality of information items from the comment database associated with a tag matching the respective tag; and automatically populating each respective modifiable field of the plurality of modifiable fields with a respective information item from the comment database by selecting the respective information item from the respective plurality of information items based on an engagement value of the user account associated with the product listing; and wherein the input/output circuitry is further configured to:

generate for display the description for the product listing.

11. The system of claim 10, wherein each tag of the plurality of tags comprises information related to a type of information item to be used in populating a modifiable field.

12. The system of claim 10, wherein the description template comprises at least one complete sentence formed by the plurality of modifiable fields combined with a series of connecting words or phrases.

13. The system of claim 10, wherein the control circuitry is configured to access, from the memory, the description template that comprises the plurality of modifiable fields by:

accessing, from the memory, a plurality of description templates corresponding to the product listing; and selecting the description template from the plurality of description templates based on an importance score associated with the description template.

14. The system of claim 10, wherein the control circuitry is configured to generate the description for the product listing by:

accessing, from the memory, multiple description templates associated with the product listing; and concatenating the multiple description templates associated with the product listing into a singular description for the product listing which comprises one or more paragraphs related to the product listing.

15. The system of claim 14, wherein the control circuitry is configured to concatenate the multiple description templates associated with the product listing into the singular description for the product listing by:

accessing, from the memory, importance scores associated with each respective description template of the multiple description templates; and concatenating the multiple description templates associated with the product listing into the singular description such that the ordering of the multiple description templates within the singular description for the product listing is based on the importance scores associated with each respective description template.

16. The system of claim 10, wherein the description template corresponds to the product listing, and wherein the description template is generated by processing descriptions associated with a plurality of similar product listings.

17. The system of claim 10, wherein the control circuitry is further configured to:

identify metadata associated with the plurality of comments, wherein the metadata includes identification of a device that each comment was received from and a respective date specifying when each comment was received; and store, in the comment database, the plurality of comments and the identified metadata associated with the plurality of comments, wherein the selecting the respective information item is further based on the respective date associated with the respective information item.

18. A non-transitory computer readable medium having instructions encoded thereon that, when executed by control circuitry, cause the control circuitry to:

receive, from at least one device, a plurality of comments associated with a product listing;

generate a tagged version of each comment of the plurality of comments by associating a tag from a plurality of tags with words or phrases of the plurality of comments, wherein the associating is performed by the control circuitry using at least one of: (a) a part-of-speech tagging technique, (b) a dependency parsing technique, or (c) a domain knowledge analysis technique;

store, in a comment database, tagged versions of the plurality of comments;

receive a request to access a page for viewing the product listing, wherein the request is associated with a user account;

generate a description for the product listing by:

accessing, from a memory, a description template that comprises a plurality of modifiable fields, wherein each modifiable field of the plurality of modifiable fields is linked to a respective tag from the plurality of tags;

identifying, for each respective modifiable field of the plurality of modifiable fields, a respective plurality of information items from the comment database associated with a tag matching the respective tag; and automatically populating each respective modifiable field of the plurality of modifiable fields with a respective information item from the comment database by selecting the respective information item from the respective plurality of information items based on an engagement value of the user account associated with the product listing; and generate for display the description for the product listing.

19. The non-transitory computer readable medium of claim 18, wherein execution of the instructions to access, from the memory, the description template that comprises the plurality of modifiable fields causes the control circuitry to:

access, from the memory, a plurality of description templates corresponding to the product listing; and select the description template from the plurality of description templates based on an importance score associated with the description template.

20. The non-transitory computer readable medium of claim 18, wherein execution of the instructions to generate the description for the product listing causes the control circuitry to:

access, from the memory, multiple description templates associated with the product listing; and concatenate the multiple description templates associated with the product listing into a singular description for the product listing which comprises one or more paragraphs related to the product listing.

* * * * *